United States Patent
Kim

[11] Patent Number: 6,137,543
[45] Date of Patent: Oct. 24, 2000

[54] GAMMA-CORRECTION CIRCUIT FOR BLUE COLOR VIDEO SIGNAL IN PROJECTION TELEVISION

[75] Inventor: Hee Chul Kim, Kyoungsangbuk-Do, Rep. of Korea

[73] Assignee: LG Electronics Inc., Seoul, Rep. of Korea

[21] Appl. No.: 08/994,777

[22] Filed: Dec. 19, 1997

[30] Foreign Application Priority Data

Dec. 21, 1996 [KR] Rep. of Korea ............... P96-69425

[51] Int. Cl.[7] ....................................... H04N 5/202
[52] U.S. Cl. ................................. 348/675; 348/674
[58] Field of Search .............................. 348/674, 675, 348/676, 677, 377, 379, 380, 254, 256, 679, 645, 646, 647, 648, 643, 644

[56] References Cited

U.S. PATENT DOCUMENTS

| | | | |
|---|---|---|---|
| 4,167,025 | 9/1979 | Willis | 348/380 |
| 4,587,554 | 5/1986 | Tamura et al. | 348/380 |
| 5,204,748 | 4/1993 | Lagoni | 345/169 |

*Primary Examiner*—Andrew I. Faile
*Assistant Examiner*—Sam Huang

[57] ABSTRACT

The present invention relates to a gamma-correction circuit which can prevent the deterioration of focusing in a projection television. The gamma-correction circuit comprises a gamma-correction section having an input for receiving a blue color video signal and operable to generate a gamma-corrected signal, a peak-beam current limiting section connected to the gamma-correction section and operable to compare a beam current corresponding to the blue color video signal with a predetermined peak-level value, the peak-beam current limiting section further operable to clip or pass the gamma corrected signal according to the comparison, and a video amplifying section connected to the peak-beam current limiting section and operable to amplify clipped or passed signal, and output the amplified signal to a blue color CRT.

1 Claim, 3 Drawing Sheets

GAMMA-CORRECTION CIRCUIT FOR BLUE COLOR VIDEO SIGNAL IN PROJECTION TELEVISION

BACKGROUND OF THE INVENTION

1. Field of the Invention

The present invention relates to a gamma-correction circuit for a blue color video signal in a television, and more particularly to a gamma-correction circuit for a blue color video signal which can prevent the deterioration of focusing in a projection television by limiting influx of the peak-current value of the gamma-corrected blue color video signal into a blue color cathode ray tube (CRT).

2. Description of the Prior Art

In general, a projection television has separate CRTs for red, green and blue color signals to display a picture on a screen. As shown in FIG. 1, the blue color video signal Vin applied to the corresponding blue color is displayed as being distorted due to the characteristic of blue color CRT, unlike the red or green. For this reason, a gamma correction circuit is provided on the blue color CRT to gamma-correct such distortion of the video signal.

FIG. 2 shows a conventional gamma-correction circuit for the blue color video signal Vin in a projection television. The circuit includes a gamma-correction section 10 for gamma-correcting the blue color video signal Vin inputted from an image processing section (not illustrated in the drawing) of a projection television; a video amplifying section 20 for amplifying the blue color video signal Vin, which has been gamma-corrected by the gamma-correction section 10, to a predetermined level; and a blue color CRT 30 for displaying the blue color video signal Vin outputted from the video amplifying section 20.

The gamma-correction circuit for a blue color video signal in a projection television as constituted above operates as follows.

If a blue color video signal Vin is inputted to the gamma-correction section 10 from the image processing section of a projection television, the gamma-correction section 10 gamma-corrects the inputted blue color video signal Vin. The blue color video signal Vin is inputted to the amplifying section 20 after being gamma-corrected in an exponential function, as illustrated in FIG. 3. The gamma-correction is performed by the gamma-correction section 10 in a manner such that the blue color video signal Vin is amplified to have opposite characteristics to that of the anode current versus brightness of the blue color CRT 30 for the blue color video signal Vin. Accordingly, the anode current versus brightness of the gamma-corrected video signal has similar characteristics to that of the red or green color video signal.

Thereafter, the video amplifying section 20 amplifies the gamma-corrected video signal to a predetermined level, and then inputs the amplified blue color video signal Vin to the blue color CRT 30. The Blue door CRT 30 displays the image on a screen (not illustrated in the drawing) via a projection lens (not illustrated in the drawing) and a light path conversion mirror (not illustrated in the drawing). Accordingly, if the blue color video signal Vin is gamma-corrected by the gamma-correction circuit, the characteristics of the white balance becomes less dependent on variation of the anode current. Ultimately, images of high quality can be displayed on the screen.

However, the conventional gamma-correction circuit in a projection television as constituted above discloses spiral characteristics in the amplifier of the gamma-correction section 10 used for gamma-correction. Therefore, the gamma-corrected video signal is inputted to the Blue color CRT 30 as peak-beam current which has much greater brightness than that graphed as (B) in FIG. 4 in comparison with the beam current prior to undergoing the gamma-correction illustrated as (A) in FIG. 4. Accordingly, as the peak-beam current flows into the blue color CRT 30, the characteristic of focusing deteriorates, thereby lowering the picture quality.

SUMMARY OF THE INVENTION

The object of the present invention is to resolve the above problems by providing a gamma-correction circuit for the blue color video signal Vin in a projection television by limiting influx of the peak-current value of the gamma-corrected video signal to the blue color CRT.

To achieve the above object, the present invention provides a gamma-correction circuit for a blue color video signal in a display device, comprising:

- a gamma-correction section having an input for receiving a blue color video signal and operable to generate a gamma-corrected signal;
- a peak-beam current limiting section connected to the gamma-correction section and operable to compare a beam current corresponding to the blue color video signal with a predetermined peak-level value, the peak-beam current limiting section further operable to clip or pass the gamma corrected signal according to the comparison; and
- a video amplifying section connected to the peak-beam current limiting section and operable to amplify the clipped or passed signal, and output the amplified signal to a blue color CRT.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The other objects and advantages of the present invention will become more apparent with reference to the preferred embodiments accompanying the drawings, in which.

DETAILED DESCRIPTION OF THE INVENTION

Figure 5:
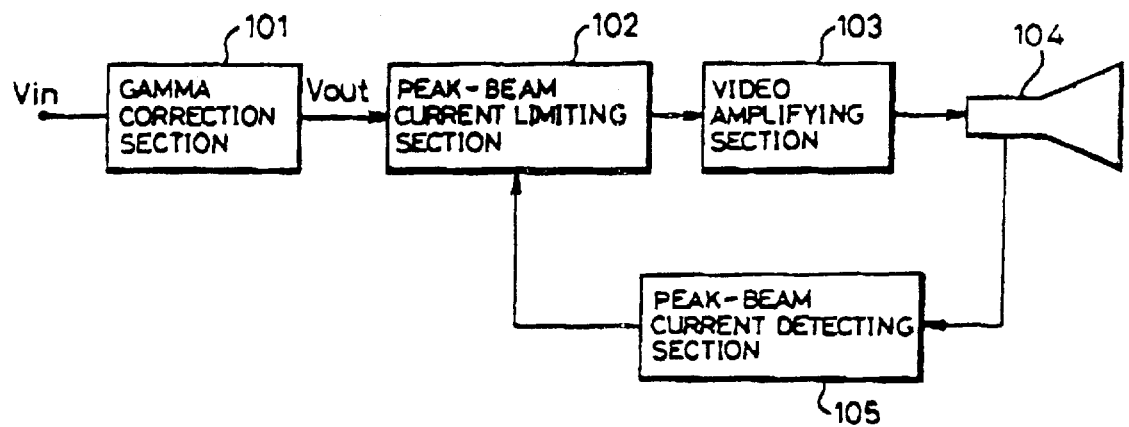
FIG. 5 is a circuit diagram illustrating a gamma-correction circuit for a blue color video signal in a projection television according to the present invention.

FIG. 5 is a circuit diagram illustrating a gamma-correction circuit for a blue color video signal in a projection television according to the present invention.

Referring to FIG. 5, the gamma-correction circuit in a projection television according to the present invention comprises: a gamma-correction section 101 for gamma-correcting a blue color video signal Vin inputted from an image processing section (not illustrated in the drawing) of the projection television; a peak-beam current section 102 for comparatively determining the video signal gamma-corrected by the gamma-correction section 101 based on the standard peak-level value, and clipping the video signal according to the compared value or outputting the video signal as is; a video amplifying section 103 for amplifying the beam current of the blue color video signal Vin outputted from the peak-beam current limiting section 102 to a predetermined level; a blue color CRT 104 for displaying the blue color video signal Vin outputted from the video amplifying section 103; and a peak-beam current detection section 105 for detecting the peak-beam current included in the blue color video signal Vin inputted to the blue color CRT 104, and returning the detected peak-beam current to the peak-beam current limiting section 102.

The gamma-correction circuit in a projection television constituted above according to the present invention operates as follows.

Figure 1:
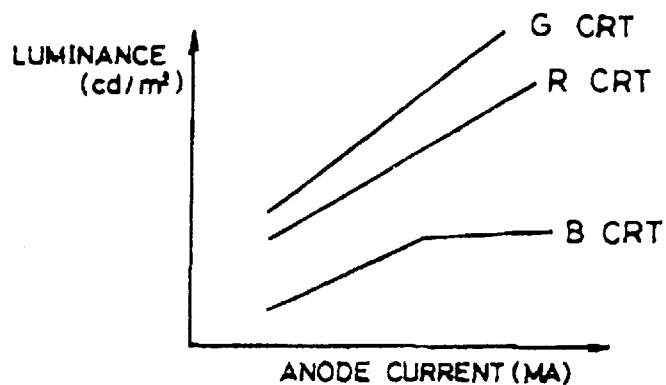
FIG. 1 is a graph illustrating characteristics of the anode current versus brightness against the CRTs for red, green and blue color video signals, respectively in the conventional projection Television.
Figure 2:
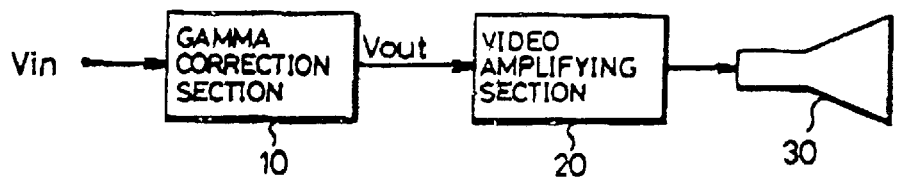
FIG. 2 is a circuit diagram showing the gamma-correction circuit for blue color video signal of the conventional projection television.
Figure 3:
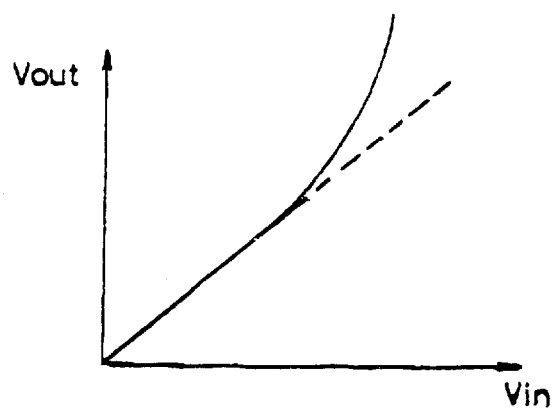
FIG. 3 is a graph illustrating the waveform outputted from the gamma-correction section in FIG. 2.
Figure 4:
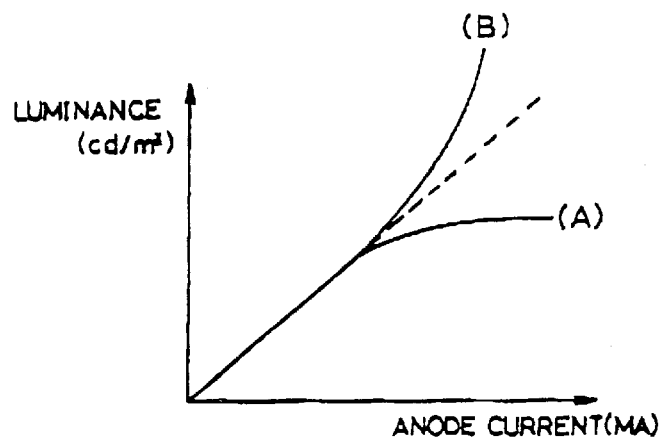
FIG. 4 is a graph illustrating characteristics of the anode current versus brightness applied to the circuit in FIG. 2.

As shown in FIG. 5, if a blue color video signal Vin is inputted to the gamma-correction section 101 from the image processing section of the projection television, the gamma-correction section 101 gamma-corrects the inputted blue color video signal Vin and outputs a gamma-corrected signal Vout. As shown in FIG. 1, the blue color video signal Vin is amplified to have opposite characteristics to that of the anode current versus brightness of the blue color CRT 30 and similar characteristics to that of the red color CRT or green color CRT. The beam current responsive to the video output signal of the gamma-correction section outputted after being gamma-corrected and amplified is inputted to the peak-beam current limiting section 102.

If the signal outputted by the peak-beam current detection section 105 is greater than a standard peak-level value, the peak-beam current limiting section 102 clips the blue video signal Vout and passes the clipped signal to the video amplifying section 103. The video amplifying section 103 then amplifies the gamma-corrected and clipped blue color video signal by a predetermined factor, and outputs the amplified blue color video signal to the blue color CRT 104.

More specifically, the peak-beam current detection section 105 detects the peak-beam current from the beam current responsive to the blue color video signal flowing in the anode terminal of the blue color CRT 104, and returns the detected peak-beam current to the peak-beam current limiting section 102. Thus, the peak-beam current limiting section 102 compares the detected peak-beam current value inputted from the peak-beam current limiting section 102. If the detected beam current value is smaller than the standard peak-level value, the peak-beam current limiting section 102 passes the video signal Vout inputted from the gamma-correction section 101 to the video amplifying section 103 as it is. If the detected beam current value is greater than the standard peak-level value, the peak-beam current limiting section 102 clips the video signal Vout inputted form the gamma-correction section 101. If the detected peak-beam current value is greater than the standard peak level value, the peak-beam current limiting section 102 inputs the clipped video signal Vout to the video amplifying section 103.

The video amplifying section 103 amplifies the gamma-corrected blue color video signal Vin by a predetermined factory, and outputs the amplified blue color video signal Vin to the blue color CRT 104. The blue color CRT 104 subsequently displays an image on a screen (not illustrated in the drawing) via a projection lens (not illustrated in the drawing) and a light path conversion mirror (not illustrated in the drawing).

Figure 6:
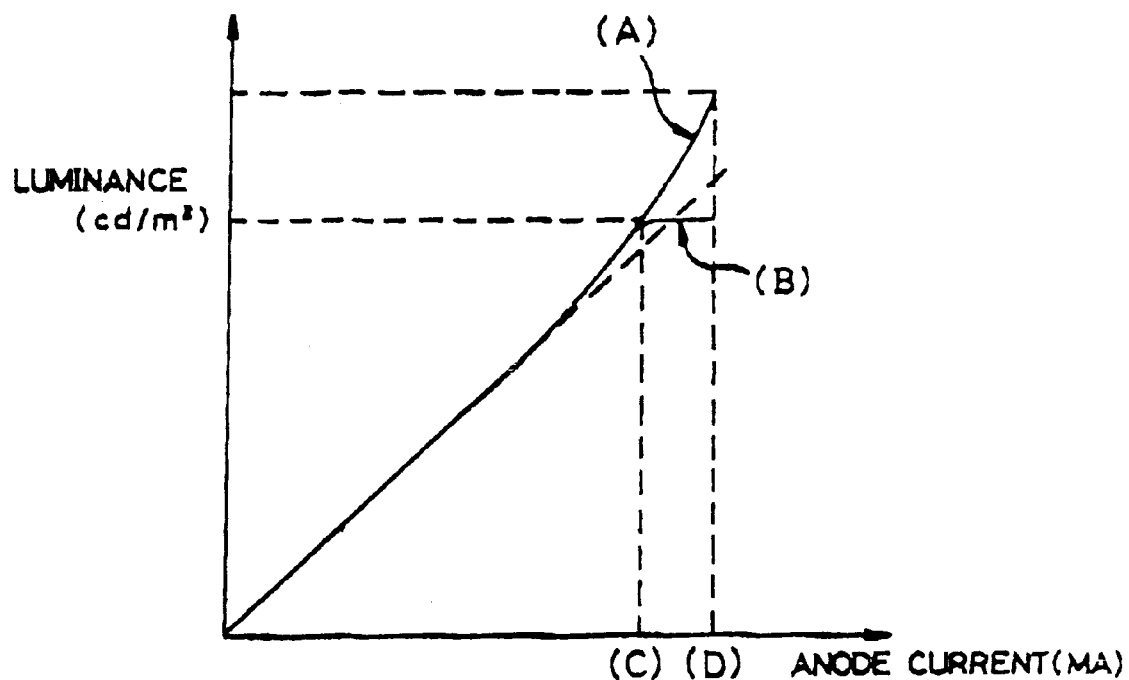
FIG. 6 is a diagram comparing characteristics of the anode current versus brightness applied to the circuit according to the present invention.

In short, if a video signal gamma-corrected by the gamma-correction section 101 is outputted to the video output section 103 without passing through the peak-beam current limiting section 102 as in the conventional gamma-correction circuit, the anode current of the blue color CRT 104 is changed from (C) to (D) in FIG. 6. Consequently, the brightness suddenly increases to cause the deterioration of focusing of the screen as shown in FIG. 6(A). According to the present invention, however, when the anode current of the blue color CRT 104 is changed from (C) to (D) in FIG. 6, the brightness does not suddenly increase but is maintained within a predetermined range, thereby not causing the deterioration of focusing.

As described above, the present invention serves to improve quality of images by maintaining the brightness at a constant level by limiting the peak-beam current of the gamma-corrected video signal inputted to the blue color CRT.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gamma-correction circuit in a projection television, comprising:

a gamma-correction section for gamma-correcting a blue color video signal and outputting a gamma-corrected signal;

a peak-beam current limiting section for comparing a detected signal with a predetermined peak-level value, and based on the comparison either clipping the gamma-corrected signal or passing the gamma-corrected signal to its output; and a video output section connected to the peak-beam current limiting section and operable to amplify the gamma-corrected or passed signal and output the amplified signal to a blue color CRT;

a peak-beam current detection section for detecting a peak-beam current included in the amplified blue color video signal inputted to the blue color CRT, and outputting the detected signal to the peak-beam current limiting section.

* * * * *